(12) United States Patent
James

(10) Patent No.: US 11,259,347 B2
(45) Date of Patent: Feb. 22, 2022

(54) DEVICE, SYSTEM, AND METHOD FOR DELIVERING AND RELAYING AN AUDIO SIGNAL

(71) Applicant: SARONIKOS TRADING AND SERVICES, UNIPESSOAL LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 0 days.

(21) Appl. No.: 16/495,329

(22) PCT Filed: Mar. 21, 2017

(86) PCT No.: PCT/IB2017/051640
§ 371 (c)(1),
(2) Date: Sep. 18, 2019

(87) PCT Pub. No.: WO2018/172814
PCT Pub. Date: Sep. 27, 2018

(65) Prior Publication Data
US 2020/0022198 A1 Jan. 16, 2020

(51) Int. Cl.
*H04W 76/14* (2018.01)
*H04W 4/80* (2018.01)
(Continued)

(52) U.S. Cl.
CPC .......... *H04W 76/14* (2018.02); *H04R 1/1041* (2013.01); *H04W 4/80* (2018.02);
(Continued)

(58) Field of Classification Search
CPC ....... H04W 76/14; H04W 4/80; H04W 84/18; H04W 88/04; H04W 92/18; H04R 1/1041; H04R 2420/07
(Continued)

(56) References Cited

U.S. PATENT DOCUMENTS 9,820,323 B1\* 11/2017 Young .................... H04W 76/14
2009/0154739 A1\* 6/2009 Zellner ................. H04R 1/1041
381/311

(Continued)

OTHER PUBLICATIONS

International Search Report dated Nov. 17, 2017, issued in PCT Application No. PCT/IB2017/051640, filed Mar. 21, 2017.
(Continued)

*Primary Examiner* — Ankur Jain
*Assistant Examiner* — Angelica M Perez
(74) *Attorney, Agent, or Firm* — Workman Nydegger

(57) ABSTRACT

An audio reproduction device, a system, and a method for allowing a first user, who is listening to a first audio signal though a first headset, is provided to invite a second user, who is listening to a second audio signal through a second headset, to quickly start listening to the first audio signal. To this purpose, the first headset sends a signalling message to the second headset and relays the first audio signal to it. Both the audio signals emitted by the audio sources and that relayed by the first headset may be transmitted by means of a Bluetooth technology enabling a device both to receive a Bluetooth signal as a slave in a piconet and to transmit a corresponding Bluetooth signal as a master in another piconet.

19 Claims, 2 Drawing Sheets

(51) Int. Cl.
  *H04R 1/10* (2006.01)
  *H04W 84/18* (2009.01)
  *H04W 88/04* (2009.01)
  *H04W 92/18* (2009.01)
(52) U.S. Cl.
  CPC ......... *H04R 2420/07* (2013.01); *H04W 84/18* (2013.01); *H04W 88/04* (2013.01); *H04W 92/18* (2013.01)
(58) Field of Classification Search
  USPC .................. 355/41.1–41.3, 569.1, 575.2
  See application file for complete search history.

(56) References Cited

U.S. PATENT DOCUMENTS

| | | |
|---|---|---|
| 2011/0320214 A1 | 12/2011 | Pilati et al. |
| 2012/0275618 A1 | 11/2012 | Tan |
| 2014/0161274 A1* | 6/2014 | Singamsetty ........ H04R 1/1041 381/74 |
| 2015/0304770 A1* | 10/2015 | Watson .................. H04R 3/12 381/79 |

OTHER PUBLICATIONS

Written Opinion dated Nov. 17, 2017, issued in PCT Application No. PCT/IB2017/051640, filed Mar. 21, 2017.

* cited by examiner

DEVICE, SYSTEM, AND METHOD FOR DELIVERING AND RELAYING AN AUDIO SIGNAL

FIELD OF THE INVENTION

The present invention relates to a device, system, and method for delivering and relaying an audio signal. In particular it relates to relaying an audio signal from a headset to another headset.

DESCRIPTION OF PRIOR ART

It may happen that somebody listening to a song, or news, or a speech, or other sounds through a wireless headset connected to an audio source (PC, personal device, music player, or another type of apparatus), wants to invite another person to listen to what he/she is listening to, while the other person is listening to something else through his/her wireless headset. In that case with the known art the invited person should disconnect his/her headset from the currently connected audio source and connect it to the same audio source as the inviting person. Moreover, if the involved audio source does not support multiple wireless connections, the inviting person should disconnect his/her headset from it.

Connecting and disconnecting wireless devices are generally cumbersome operations and disconnecting from his/her audio source would be annoying.

In such a case, it would be desirable for the invited 7 in the following description the term "alternative audio signal" means an audio signal different from that one that the second user is currently listening to, before being invited to listen to an audio signal coming from an audio source different from that currently connected.

SUMMARY OF THE INVENTION

It is therefore an object of the present invention to provide a device, a system, and a method allowing a first user, who is listening to a first audio signal through a first headset, to invite a second user, who is listening to a second audio signal through a second headset, to listen to the first audio signal and relaying the first audio signal from the first headset to the second headset.

Another object of the invention is allowing a person to invite a group of people to listen to the first audio signal that he/she is listening to.

Another object of the invention is to provide a way for allowing a first user to send a voice message to a second user.

The above objects are achieved by a device, a system, and a method, in particular through an audio reproduction device enabled to wirelessly receive an audio signal from an audio source, wirelessly transmit an alternative audio signal to another device, and to transmit and receive signalling messages to and from companion devices.

A user of such a device can thus receive an audio signal, and, according to the interest that that audio may have, send an invitation for other people to connect to a given audio source in order to listen to the same audio signal.

In some embodiments of the invention, the audio reproduction device of the inviting user relays the audio signal that it receives, so that in this case it is acting as audio source and as the inviting user's audio reproduction device.

In other embodiments, the inviting user may communicate an identifier of the audio source delivering the first audio signal and this additional audio source will be that one acting as alternative audio source.

On the other hand, a user of an audio reproduction device according to the invention may receive an invitation to connect to a given audio source and, according to his/her interest and circumstances, he/she may decline the invitation or give his/her consent for his/her device to connect to the alternative audio source.

The wireless transmission means for receiving and transmitting audio signals and for receiving and transmitting signalling messages can be implemented by many types of wireless technologies that the skilled person knows. As a main example, for the wireless transmission and reception of audio signals one can utilize a Bluetooth technology (in particular in the range of 2,402 GHz to 2,480 GHz and in particular Bluetooth versions 1.0 to 5 or higher versions), whereby a Bluetooth device can act as master in one piconet and slave in another piconet. This description mostly refers to this technology, but this is not to be considered limitative, since the skilled person can also devise other techniques to achieve the same result.

BRIEF DESCRIPTION OF THE DRAWINGS

The features of the invention are specifically set forth in the claims annexed to this description; such characteristics will be clearer from the following description of a preferred and non-exclusive embodiment shown in annexed drawings, wherein:

DETAILED DESCRIPTION OF THE INVENTION

In this description, any reference to "an embodiment" will indicate that a particular configuration, structure or feature, described in regard to the implementation of the invention, is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for the sake of simplicity, and do not limit the protection scope or extension of the various embodiments.

Figure 1:
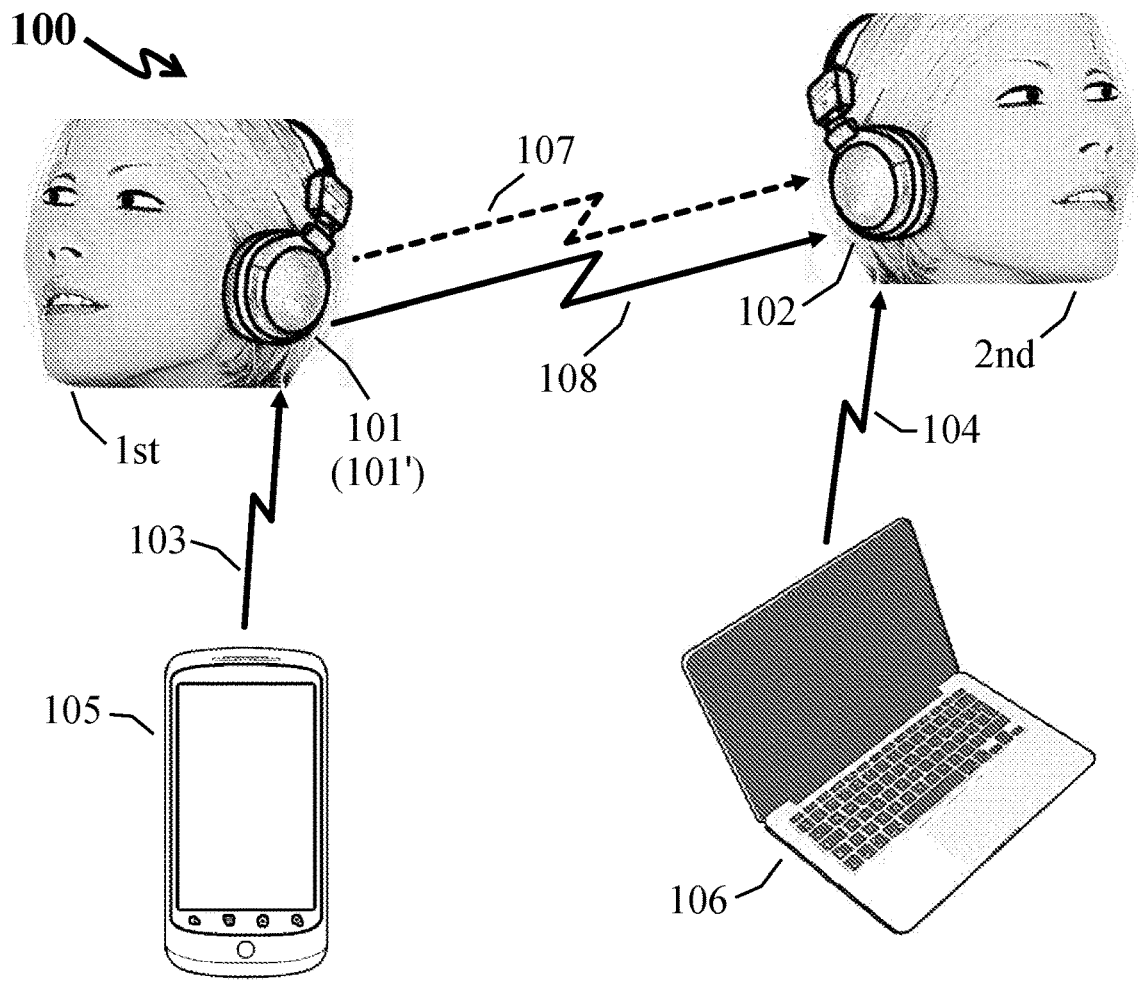
FIG. 1 shows the main components of a system for inviting a person to listen to an alternative audio signal that can be relayed from a headset to another headset.

As shown in FIG. 1, the system according to the invention comprises a plurality of audio sources 105,106, each configured to wirelessly emit an audio signal, and a plurality of audio reproduction devices 101,102, which are enabled to both wirelessly receive an audio signal from an audio source and wirelessly transmit an audio signal.

In this description, an audio reproduction device 101,102 is also referred to as headphones or headset, but it is to be understood that the term "audio reproduction device" 101, 102 encompasses many device types, including personal computers, tablets, smartphones, and others. Therefore any particular term used to refer to the "audio reproduction device" 101,102 is not to be considered limitative. This holds true also where, for the sake of brevity, an audio reproduction device 101,102 is simply called "device", being clear from the context to what it refers.

Figure 2:
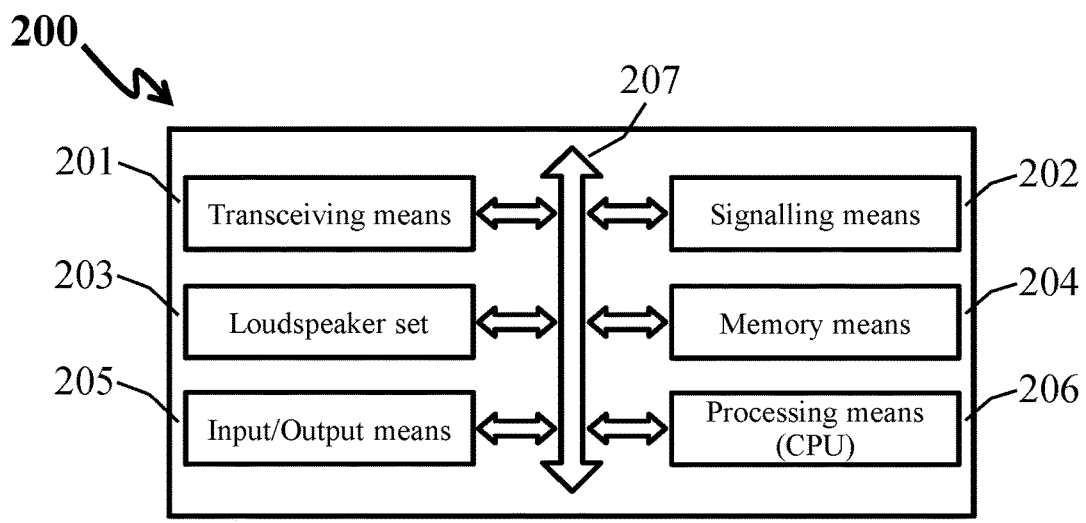
FIG. 2 shows the main elements of a device according to the invention.
Figure 3:
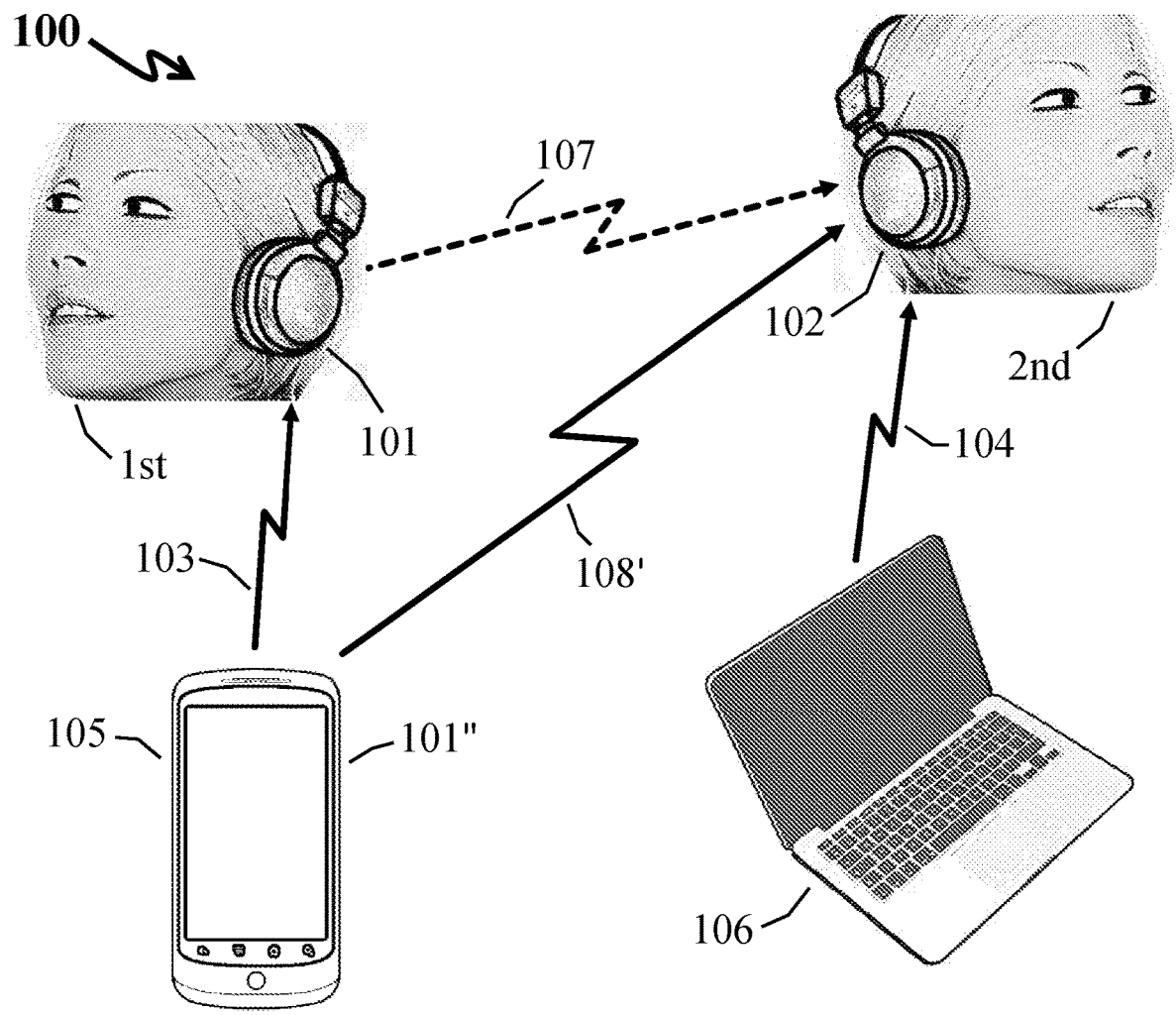
FIG. 3 shows the main components of a system for inviting a person to listen to an alternative audio signal according to a third embodiment of the present invention.

An audio reproduction device 101,102, comprises the following elements, that are also shown in FIG. 2:

transceiving means 201 for wirelessly connecting to an audio source 105,106 or to another audio reproduction device 101,102, and for receiving and transmitting an audio signal, signalling means 202 for emitting and receiving a signalling message, loudspeaker set 203 for reproducing an audio signal, input/output means 205 for interacting with a user, memory means 204 for storing software codes and data, comprising at least the identifier of at least one audio source 105,106, processing means 206 in communication, through bus 207, with said transceiving means 201, said signalling means 202, said loudspeaker set 203, said input/output means 205, and said memory means 106.

The transceiving means 201 can be implemented, as a preferred example, by a Bluetooth technology whereby a Bluetooth device can act as master in one piconet and a slave in another piconet. With Bluetooth, an audio streaming may be delivered according to the A2DP (Advanced Audio Distribution Profile) profile of the Bluetooth specification.

However the skilled person understands that many other transmission technologies can be adopted, including ad-hoc designed transmitters and receivers.

The signalling means 202 are for transmitting a data packet basically carrying an information content of few hundred bits. For them a large variety of solutions can be envisaged, also depending on the frequency band that will be chosen for the carrier frequency. As an example, in case the transceiving means 201 are implemented by a Bluetooth technology, which is designed for ISM (Industrial, Scientific and Medical) applications, mobile services, and other services, the signalling means 202 could be advantageously implemented in the same frequency band, to share the antenna system.

In designing the signalling transceiver it is worth to take into account that the time/frequency/space occupancy of the signals transmitted by the signalling means 202 is very low, because the transmission range can be as short as that of Bluetooth, the amount of information transmitted is a few hundred bits, and the transmission events are rare.

Assuming that a signalling packet has to be transmitted within few hundred milliseconds, the information bit rate is of order of few kbit/s, but the actual physical layer gross bitrate will be much higher, because of the physical layer protocol overhead, coding for correcting transmission errors, and a possible spread spectrum technique.

Since overheads, coding, and spread spectrum do not increase the required energy per information bit by a large amount, and the information bit rate of Bluetooth protocols are of the order of megabits per second, the transmit power of the signalling means 202 will be lower than that of Bluetooth by some order of magnitude.

Considering that the signalling means 202 may have a radio channel narrower than that of a Bluetooth channel and a transmit power substantially lower, they may take, for example, a band at the edges of the Bluetooth band, where guard bands are provided for keeping the Bluetooth out-of-band emissions at a low level.

A spread spectrum technique is desirable for mitigating interferences of the signalling means 202 to and from other radio systems. It may be a Frequency-Hopping Spread Spectrum (FHSS) or a Code Division Multiple Access (CDMA) or a combination of them (FH-CDMA).

Forward correcting codes, repetitions, and other techniques known by the skilled person may be used for detecting and correcting transmission errors.

A large variety of modulation method may be adopted, including the simple binary Frequency Modulation (FM) scheme, binary, quaternary, octonary PSK (Phase Shift Keying), Gaussian Frequency Shift Keying (GFSK), π/4 DQPSK (Differential Quadrature Phase-Shift Keying), and others well known by the skilled person.

The receiver may be of superheterodyne type with an intermediate frequency (IF) that allows optimum filtering, or a Direct-Conversion Receiver (DCR), also known as homodyne receiver or zero-IF receiver.

The signalling means 202 are mainly used by the audio reproduction device (101) for inviting the audio reproduction device (102) to get connected to an alternative audio source. Such an invitation may be sent by means of a data packet which comprises at least an access code, identifying the transmission system of the signalling means 202, an identity of the invited audio reproduction device 102, a code for the invitation, and an identity of the alternative audio source to which the invited device should get connected.

Due to the narrowband characteristic, the reception section of the signalling means 202 will have a very low power consumption.

If the transceiving means 201 are implemented by a Bluetooth technology, it could be advantageous to utilize Bluetooth also for implementing the signalling means 202. To this purpose we assume that:

a Bluetooth device can act as master in a piconet and as a slave in another piconet at the same time;

the Bluetooth specification allows devices to form a scatternet, whereby the master of a piconet can elect a slave device of another piconet to also participate as a slave in its piconet, and the employed devices are conformant to the profile OPP (Object Push Profile) of the Bluetooth specification, whereby the slave device participating in two piconets can communicate with the masters of both piconets.

Referring to the scenario shown in FIG. 1, we assume that the audio reproduction device 101 is connected, as a slave, to the audio source 105, which is master in a first piconet, while the audio reproduction device 102 is connected, as a slave, to audio source 106, which is master in a second piconet. To invite the device 102 to get connected to itself, in order to deliver an audio streaming to it, the audio reproduction device 101 set up an alternative piconet, taking in this the role of master while keeping its participation in the first piconet as a slave, and, assuming that it knows the address, or name, of the audio reproduction device 102, pages the audio reproduction device 102.

If the audio reproduction device 102 responds, the audio reproduction device 101 gets connected to the audio reproduction device 102, which becomes a slave in both the second piconet and the alternative piconet. Since, as said above, both nodes are conformant to profile OPP (Object Push Profile) of the Bluetooth specification, they can start exchanging messages.

The characteristics of the loudspeaker set 203 and of the input/output means 205 depend on the type of audio reproduction device 101,102 adopted. In particular, a device may have pushbuttons, switches, text to speech synthesizer, means for providing gesture controls, microphone, speech to text converter, a simple display or a touch screen, and other input/output means. In any case it should be assumed that the input/output means 205 allows the user to input the data and commands and get the information needed for the operation of the device.

In the preferred embodiment of the invention, a first audio reproduction device 101, upon an input from its user (first user 1st), gets connected to a first audio source 105, from it receives a first audio signal 103 by means of transceiving means 201, and reproduces that audio signal 103 for its user (first user 1st) by means of the loudspeaker set 203.

Similarly, a second audio reproduction device 102 gets connected to a second audio source 106, receives a second audio signal 104, and reproduces that second audio for its user (second user 2nd).

While listening to that first audio, it may happen that the first user 1st considers that the audio he/she is listening to may be of interest to the second user 2nd. Therefore, through the input/output means 205 of his/her device, he/she inputs command and data for the first audio reproduction device 101 to send, by means of the signalling means 202, a signalling message carrying an invitation for the second user 2nd to listen to the same first audio 103.

In a general case, the first user 1st invites the second user 2nd to get connected to an alternative audio source (it may be 101 and therefore in the following called 101') and get an alternative audio signal 108. Therefore an invitation message 107 comprises at least an identity of that alternative audio source (101'), besides the identity of the second audio reproduction device 102, to which the invitation message 107 is addressed. For consistency with the general case, this terminology will be used all over the description.

In the case of the preferred embodiment of the invention, the "alternative audio signal", that the second user is invited to listen to, is a retransmission 108 of the first audio signal 101' by the first audio reproduction device 101. Therefore the identity of the alternative audio source 101' is the identity of the transmit section of the transceiving means 201 of the first audio reproduction device 101.

After sending said invitation message 107, the first audio reproduction device 101 activates its means for providing a retransmission of the first audio signal 108 to the second audio reproduction device 102.

To show how this retransmission can be done, let us assume, as an example, that the transceiving means 201 are implemented by a Bluetooth technology able to support scatternets, whereby a Bluetooth device is enabled both to receive a Bluetooth signal as a slave in a first piconet and to transmit a corresponding Bluetooth signal as a master in a second piconet. In this case, the transceiving means 201 of the first audio reproduction device 101 are a slave in the piconet (the first piconet) set up by the first audio source 105 to deliver the first audio signal 103, while they are the master in the piconet (second piconet) that themselves set up for delivering, as an alternative audio source 101', a retransmission 108 of the first audio signal 103.

Then the transceiving means 201 of the first audio reproduction device 101 wait for the second reproduction device 102 to connect to the second piconet as a slave.

On the other side, the second audio reproduction device 102 receives, through its signalling means 202, the signalling message 107 carrying the invitation by the user of the first audio reproduction device 101, detects the identity of the alternative audio source 101', and gets connected to the first audio reproduction device 101. So, the second audio reproduction device 102 receives the retransmission of the first audio signal 103 and reproduces it for its user.

In the preferred embodiment of the invention, upon receiving the invitation message 107 the second audio reproduction device 102 automatically disconnects from the second audio source and connects to the alternative audio source 101', allowing the second user 2nd to start listening to the alternative audio signal 108, that is the audio signal that the first user 1st is listening to.

These automatic operations may be managed by the processing means 206 without requiring any action by the second user 2nd, considering that the processing means 206 can get the identity of the alternative audio source 101' from the content of the invitation message 107. Assuming that the devices involved have been previously paired, the automatic connection switching from the second audio source 106 to the alternative audio source 101' can be very fast.

In a second embodiment of the invention the second user 2nd is given a chance to decline the invitation. To this purpose its audio reproduction device 102 outputs, through its input/output means 205, an information on the invitation received from the first audio reproduction device 101, and waits for inputs from its user. The second user 2nd inputs command and data relevant to the action to perform and, on their basis, the audio reproduction device 102 keeps connected to the second audio source 106, and continues to receive the second audio signal, or gets connected to the alternative audio source and start receiving the alternative audio signal.

In a third embodiment of the invention the first user 1st may invite the second user 2nd to get an alternative audio signal 108' from an alternative audio source 101" other than the first audio reproduction device 101 and the wireless transmit section of the transceiving means 201 of the first audio reproduction device 101 and sends the relevant invitation message 107. In this case the alternative audio signal may be different from the first audio signal 108, except in the case in which the first audio source 105 supports multiple connections and the identity of the alternative audio source 101" is that of the first audio source 105. In this case the second user 2nd can directly receive the first audio signal 103 from the first audio source 105.

In a fourth embodiment of the invention the invitation to listen to an alternative audio signal is sent to a group of audio reproduction devices 101,102, which perform as what is specified for the second audio reproduction device 102. If, for example, the transceiving means 201 are implemented by a Bluetooth technology able to support scatternets, the audio signal may be retransmitted from one audio reproduction device 101,102 to another (a retransmitting devices acts as a slave in the piconet where it receives the audio signal and as master in the piconet where it retransmits the audio signal). In this case the invitation message from the first reproduction device 101 comprises the list of the devices of the group to invite. Each device of the group, upon receiving it invitation, removes from the received list of devices to invite its own identifier and forwards the invitation, comprising the reduced list of devices that are still to be invited, to another device. Through such a chain, all the devices of the group receive the invitation and may receive an alternative audio signal. If the users are given a chance to decline the invitation, in case of declined invitation the relevant device forwards regularly the invitation, but keeps connected to its current audio source.

If the technology adopted for the delivery of audio signals supports point-to-multipoint connections, the transmission chain could be shortened, as each device could retransmit the audio signal it receives to a number of other devices.

In a fifth embodiment of the invention the audio reproduction device 101,102 is also equipped with a microphone and means to activate and deactivate it. In this case the first user 1st may send the sound picked up by the microphone as an alternative audio signal, allowing the first user 1st to send a voice message to the second user 2nd. This is advantageous when the first user 1st has an urgent need to communicate something to the second user 2nd, while the second user 2nd cannot directly hear the voice of the first user 1st due to their reciprocal distance and possible sound shields between them, mainly if the second user has closed headphones.

So far, to simplify the description, no acknowledgment of the reception of the invitation to listen to a given audio signal has been mentioned. However the skilled person understands that many forms of acknowledgement can be issued by the invited party through the signalling means 202. Such acknowledgement may be a simple acknowledgement of reception of the signalling message 107 or may comprise additional information, such as the declination or acceptance of the invitation, the reasons for the declination, and possible other information.

The first audio reproduction device 101, upon receiving said acknowledgement through its signalling means 202, may present the acknowledgement content to its user through its input/output means 205.

If a Bluetooth technology is used, setting up connections and switching connections can be made fast and easy if the devices are previously paired, as the skilled person knows.

With the aforesaid features of the invention, a person can inviting another person, such as a relative, a friend or a colleague, to listen to an interesting audio that is being reproduced by his/her headset and instantly relay that audio to the other person's headset. Moreover, in case of an urgent need, he/she can send a vice message to another person through the microphone of his headset, overriding the audio signal that the other person is listening to.

The present description has tackled some of the possible variants, but it will be apparent to the person skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. An audio reproduction device enabled to both wirelessly receive audio signals from an audio source and wirelessly transmit audio signals, comprising:
    transceiving means for wirelessly connecting to an audio source or to another audio reproduction device and receive and transmit audio signals;
    loudspeaker set for reproducing audio signals;
    input/output means for interacting with a user;
    memory means for storing software codes and data;
    signalling means for emitting a signalling message;
    memory means for storing data comprising at least an identifier of at least one audio source;
    processing means in communication with at least said transceiving means, said loudspeaker set, said input/output means, and said memory means;
    wherein said processing means are configured for:
        connecting said audio reproduction device to an audio source and receiving audio signals by means of said transceiving means;
        reproducing said audio signal by means of said loudspeaker set;
    wherein said processing means are also configured for:
        receiving, by means of said input/output means, a request from its user to send to said another audio reproduction device an invitation to get connected to an alternative audio source and receive from it an alternative audio signal, the invitation being acceptable or declinable by a user of the another audio reproduction device by the another audio reproduction device outputting information about the invitation and waiting for an input response from the user of the another audio reproduction device;
        transmitting said signalling message to said another audio reproduction device, by means of said signalling means, said signalling message comprising at least said invitation, an identity of said another audio reproduction device and an identity of said alternative audio source, according to said request received by its user, wherein said identity of said alternative audio source identifies the wireless transmit section of the transceiving means of said audio reproduction device as said alternative audio source;
        transmitting said audio signal by means of said transceiving means as said alternative audio signal.

2. The audio reproduction device according to claim 1, wherein said invitation is sent to a group of audio reproduction devices.

3. The audio reproduction device according to claim 2, wherein each device of said group of audio reproduction devices is configured to receive, as part of the signalling message with the invitation, a list of devices and to remove their own identifier from the list of devices to create a reduced list and to forward the invitation with the reduced list to other devices.

4. The audio reproduction device according to claim 1, wherein said input/output means comprise a microphone and said alternative audio signal is a sound picked up by said microphone.

5. The audio reproduction device according to claim 1, wherein said transceiving means are of a Bluetooth technology enabling a device both to receive a Bluetooth signal as a slave in a piconet and to transmit a corresponding Bluetooth signal as a master in another piconet.

6. The audio reproduction device according to claim 1, wherein said signalling means are implemented by a radio transmission system operating in at least one portion of the Bluetooth frequency band comprising the Bluetooth frequency guard bands.

7. The audio reproduction device according to claim 1, wherein said signalling means are of a Bluetooth technology enabling the implementation of a scatternet, whereby the master device of a piconet can elect a slave device participating in another piconet to also participate as a slave in the piconet of said master device.

8. A wireless system for sharing an audio signal, comprising a plurality of audio sources, each of the audio sources in the plurality of audio sources configured to wirelessly emit audio signals, and a plurality of audio reproduction devices, enabled to both wirelessly receive audio signals from an audio source of said plurality of audio sources and wirelessly transmit audio signals, wherein:
    a first audio reproduction device of said plurality of audio reproduction devices gets connected to a first audio source of said plurality of audio sources; and
    a second audio reproduction device gets connected to a second audio source of said plurality of audio sources;
wherein:
    said first audio reproduction device is configured to send, according to its user's input, a signalling message carrying an invitation for said second audio reproduction device to get connected to an alternative audio source and reproduce an alternative audio signal, said invitation comprising at least an identity of said second audio reproduction device and an identity of said alternative audio source, wherein said identity of said alternative audio source identifies, as said alternative audio source, the wireless transmit section of the transceiving means of said first audio reproduction device; and said second audio reproduction device is also configured to receive said signalling message and present said carried invitation to its user through its input/output means and wait for the second audio reproduction device's user, and, according to the second reproduction device's user's input, decline said invitation or get connected to said alternative audio source and reproduce said alternative audio signal.

9. The wireless system according to claim 7, wherein said identity of said alternative audio source identifies an audio source other than said second audio source and said wireless transmit section of the transceiving means of said first audio reproduction device.

10. The wireless system according to claim 7, wherein said invitation is sent to a group of said audio reproduction devices and each device of said group of audio reproduction devices performs as specified for said second audio reproduction device.

11. The wireless system according to claim 10, wherein each device of said group of audio reproduction devices is configured to receive, as part of the signalling message with the invitation, a list of devices and to remove their own identifier from the list of devices to create a reduced list and to forward the invitation with the reduced list to other devices.

12. A method for sharing an audio signal delivered by an audio source of a plurality of audio sources among a group of a plurality of audio reproduction devices enabled to both wirelessly receive audio signals from an audio source and wirelessly transmit audio signals, comprising:
 a first connection phase, in which a first audio reproduction device of said plurality of audio reproduction devices gets connected to a first audio source of said plurality of audio sources and reproduces a first audio signal delivered by said first audio source;
 a second connection phase, in which a second audio reproduction device of said plurality of audio reproduction devices gets connected to a second audio source of said plurality of audio sources and reproduces a second audio signal delivered by said second audio source;
 an invitation phase, in which said first audio reproduction device, according to an its user's input, sends a signalling message to said second audio reproduction device, said signalling message comprising an invitation for said second audio reproduction device to get connected to an alternative audio source and reproduce an alternative audio signal, said invitation comprising at least an identity of said second audio reproduction device and an identity of said alternative audio source, wherein said identity of said alternative audio source identifies, as said alternative audio source, the wireless transmit section of the transceiving means of said first audio reproduction device;
 a determination phase, in which said second audio reproduction device, outputs information about the invitation and waits for an input response from the user of the second audio reproduction device, and according to an its user's input, declines said invitation or gets connected to said alternative audio source and reproduces said alternative audio signal according to said invitation.

13. The method for sharing an audio signal according to claim 10, wherein said identity of said alternative audio source identifies an audio source other than said second audio source and said wireless transmit section of the transceiving means of said first audio reproduction device.

14. The method for sharing an audio signal according to claim 10, wherein said invitation is sent to a plurality of said audio reproduction devices and each device of said plurality of audio reproduction devices performs as specified for said second audio reproduction device.

15. A non-transitory computer readable storage medium having stored thereon portions of software code for executing the phases of the method according to claim 12 as an operating system of a headset, telephone, tablet pc, portable audio players, acoustic transducers, devices or downloadable applications.

16. The method for sharing audio signals according to claim 14, wherein each device of said plurality of said audio reproduction devices are configured to receive, as part of the signalling message with the invitation, a list of devices and to remove their own identifier from the list of devices to create a reduced list and to forward the invitation with the reduced list to other devices.

17. An audio reproduction device enabled to wirelessly receive audio signals from an audio source, comprising:
 transceiving means for wirelessly connecting to an audio source or to another audio reproduction device and receive and transmit audio signals;
 loudspeaker set for reproducing audio signals;
 input/output means for interacting with a user;
 memory means for storing software codes and data;
 signalling means for receiving a signalling message;
 memory means for storing data comprising at least an identifier of at least one audio source;
 processing means in communication with at least said transceiving means, said loudspeaker set, said input/output means, and said memory means, wherein said processing means are configured for:
  connecting said audio reproduction device to said audio source and receiving a audio signal by means of said transceiving means;
  reproducing said audio signal by means of said loudspeaker set;
 wherein in that said processing means are also configured for:
 receiving the signalling message by means of said signalling means, said signalling message comprising:
  an invitation to get connected to an alternative audio source and receive from said alternative audio source, an alternative audio signal, the invitation being acceptable or declinable by a user of the audio reproduction device by the audio reproduction device outputting information about the invitation and waiting for an input response from the user of the audio reproduction device;
  an identity of the audio reproduction device and an identity of said alternative audio source, wherein said identity of said alternative audio source identifies the wireless transmit section of the transceiving means of said another audio reproduction device as said alternative audio source;

connecting said audio reproduction device to said alternative audio source according to the content of said received signalling message;

receiving said alternative audio signal, by means of said transceiving means, and reproducing said alternative audio signal by means of said loudspeaker set of said audio reproduction device.

18. The audio reproduction device according to claim 17, wherein said identity of said alternative audio source identifies an audio source other than said second audio source and said wireless transmit section of the transceiving means of said first audio reproduction device.

19. The audio reproduction device according to claim 17, wherein said processing means are also configured for:

outputting information on said invitation received from said other audio reproduction device, by means of said input/output means;

receiving input from its user on the action to perform regarding said invitation, by means of said input/output means;

keeping connected to said audio source and receiving said second audio signal or getting connected to said alternative audio source and receiving said alternative audio signal, by means of said transceiving means, on the basis of said input from its user on said action to perform.

\* \* \* \* \*